Figure 1A:
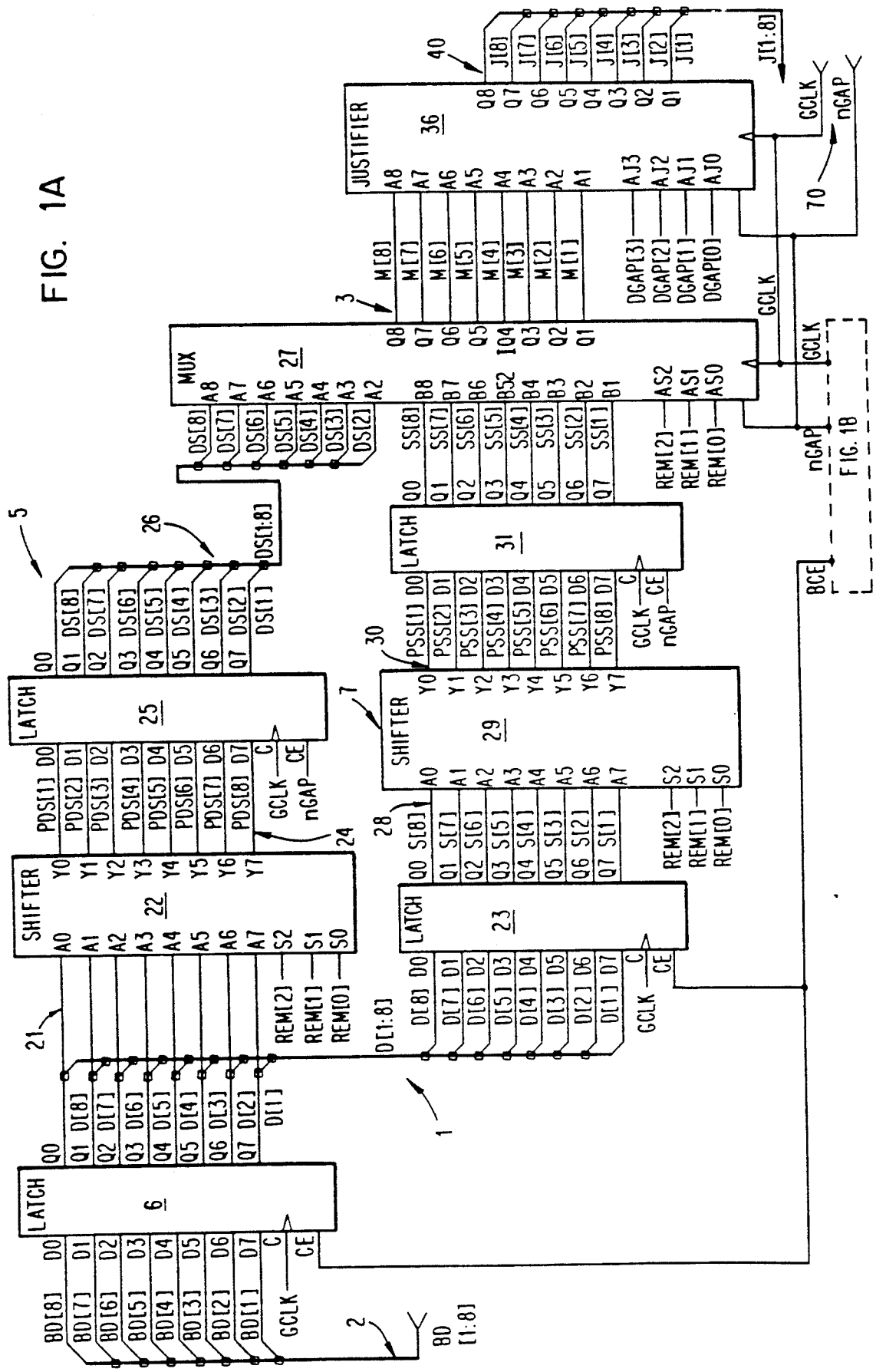

United States Patent [19]

Beanland

[11] Patent Number: 5,327,126
[45] Date of Patent: Jul. 5, 1994

[54] APPARATUS FOR AND METHOD OF PARALLEL JUSTIFYING AND DEJUSTIFYING DATA IN ACCORDANCE WITH A PREDETERMINED MAPPING

[75] Inventor: Matthew G. Beanland, Ringwood, Australia

[73] Assignee: Hewlett-Packard Company, Palo Alto, Calif.

[21] Appl. No.: 920,059

[22] Filed: Jul. 28, 1992

[30] Foreign Application Priority Data

Jun. 26, 1992 [AU] Australia ............................... PL3249

[51] Int. Cl.$^5$ ............................................. H03M 9/00
[52] U.S. Cl. ..................................... 341/101; 370/102
[58] Field of Search ................. 370/101, 102; 341/61, 341/100, 101

[56] References Cited

U.S. PATENT DOCUMENTS

| | | | |
|---|---|---|---|
| 4,589,108 | 5/1986 | Billy | 370/84 |
| 4,669,080 | 5/1987 | Aveneau et al. | 370/101 |
| 4,674,088 | 6/1987 | Grover | 370/100 |
| 5,030,951 | 7/1991 | Eda et al. | 341/100 |
| 5,192,950 | 3/1993 | Stephenson | 341/100 |

FOREIGN PATENT DOCUMENTS 0103076  3/1984  European Pat. Off. .

Primary Examiner—Howard L. Williams

[57] ABSTRACT

A justifier for parallel justifying data onto a DS-3 mapping includes an input bus for selectively communicating 8 respective I bits simultaneously to the justifier. An output bus receives I, R, O and C bits from the justifier in accordance with the mapping at an eighth of the envelope rate of 44.736 Mb/s. A first data path connected to an input bus via a latch communicates a required number of the I bits to the output bus, during a first cycle of GCLK. A second data path connected to the input bus via the same latch communicates the remainder of the I bits to the output bus over one or more subsequent GCLK cycles to satisfy the mapping. The justifier includes a controller for regulating the flow of the I bits along first and second paths. The controller responds to a first control indicative of the mapping to be followed as provided by a sequencer. The I bits moving along the first and second data paths are received by a triangular multiplexer which selects an appropriate number of the I bits from each path for subsequent transmission to the output bus. A de-justifier, generally complementary in operation to the justifier, de-justifies data from a predetermined mapping. The de-justifier is ideally suited to de-justify data originating from the justifier.

26 Claims, 4 Drawing Sheets

APPARATUS FOR AND METHOD OF PARALLEL JUSTIFYING AND DEJUSTIFYING DATA IN ACCORDANCE WITH A PREDETERMINED MAPPING

The present invention relates to a justifier and de-justifier and in particular to a justifier and de-justifier for respectively performing the parallel justification and de-justification of data in accordance with a predetermined mapping.

The justifier has been developed primarily for mapping DS-3 into an STS-1 synchronous payload envelope and will be described hereinafter with reference to that application. However, it will be appreciated that the invention is not limited to this particular field of use and is also suitable for mapping CEPT H4 into an STM-1 synchronous payload envelope as well as for use in most data rate adaption circuits.

Hitherto, the mapping of a stream of information bits (hereinafter referred to as "I bits") in a parallel format into an asynchronous serial bit stream has generally included forming a serial bit stream having a required format and then inserting the required control or fixed bits. These bits are hereinafter respectively referred to as "C" and "R" bits. Additionally, overhead communication bits or "O" bits may be included in the serial bit stream. These R, O and C bits are collectively referred to as stuffing, and are added to the bit stream in accordance with the required mapping. The process of arranging the I bits into the required format for later stuffing is referred to as justification while the process of removing the I bits from between stuffed bits is referred to as de-justification.

Such prior art justification systems usually run from a clock operating at a high rate or the envelope rate, which is gapped so that a clock at a lower rate is produced. The data is operated on in a serial manner and the addition of stuffing into the data stream results in the rate adaptation.

In order to operate on the serial bit stream it is necessary to perform operations at a high speed which results in expensive and power consuming componentry being required. Moreover, such componentry is not predisposed for high level integration and as a result requires large amounts of board space.

It is an object of the present invention, at least in its preferred embodiment, to overcome or substantially ameliorate at least some of these deficiencies of the prior art.

It is another object of the invention to provide parallel justification and subsequent de-justification at a clock rate which is substantially less than the envelope rate.

According to a first aspect of the invention there is provided a justifier for performing the parallel justification of data in accordance with a predetermined mapping, the justifier including:

an input bus for selectively communicating a plurality of information bits to the justifier;

an output bus for receiving the information bits from the justifier in accordance with the mapping and at a predetermined rate;

a first data path connected to the input bus for communicating to the output bus during a first cycle a required number of the information bits;

a second data path connected to the input bus for communicating to the output bus during one or more subsequent cycles the remainder of the information bits such that the mapping is satisfied.

Preferably, a justifier includes control means for regulating the flow of the information bits along the first and second data paths. More preferably, the control means is responsive to a first control signal indicative of the mapping, the first control signal being provided by a sequencer.

Preferably also, the control means sums successive first control signals for providing a remainder signal.

In a preferred form the sequencer provides sequential first control signals which are indicative of the number of data bits required to be communicated to the output bus during respective cycles.

In a preferred form, the first data path includes a first shifter responsive to the remainder signal during a first cycle for moving the predetermined number of information bits into a least significant bit position, a second path including a second shifter responsive to the remainder signal during a second cycle following said first cycle for moving the remainder of the information bits into the least significant bit position and the first and second data paths communicating with respective inputs of a multiplexer which is responsive to the remainder signal during a third cycle following the second cycle for selecting the required information bits from the first and second data paths for subsequent transmission to the output bus.

Preferably, the control means produces a clock disable signal which is operative when the remainder signal in one cycle is greater than the first control signal for the previous cycle. More preferably, the input bus is responsive to said clock disable signal for preventing any data being communicated to the justifier during the next cycle.

In other preferred forms the output bus communicates with a final justifier circuit for ensuring the information bits on the output bus are in either the least or most significant bit positions. In this form the final justifier circuit is preferably responsive to the first control signal. Alternatively, the final justifier is responsive to a second control signal for ensuring the information bits are in a desired significant bit positions.

According to a second aspect of the invention there is provided a de-justifier for performing the parallel de-justification of data from a predetermined mapping, the de-justifier including:

an input bus for communicating to the de-justifier, in accordance with the mapping, a plurality of bits at a predetermined rate;

an output bus for receiving a predetermined number of information bits from the de-justifier;

a first data path connected to the input bus for communicating to the output bus during a first cycle at least some of the information bits;

a second data path connected to the input bus for communicating to the output bus during one or more subsequent cycles further information bits such that the predetermined number of information bits are communicated to the output bus.

According to a third aspect of the invention there is provided a method for performing the parallel justification of data in accordance with a predetermined mapping, the method including:

providing an input bus for selectively communicating a plurality of information bits to a justifier;

providing an output bus for receiving the information bits from the justifier in accordance with the mapping and at a predetermined rate;

communicating a required number of the information bits from the input to the output bus during a first cycle; and communicating during one or more subsequent cycles the remainder of the information bits to satisfy the mapping.

According to a fourth aspect of the invention there is provided a method for performing the parallel de-justification of data from a predetermined mapping, the method including:

communicating to an input bus in accordance with the mapping a plurality of bits at a predetermined rate;

providing an output bus for receiving a predetermined number of information bits from the justifier;

communicating from the input to the output bus at least some of the information bits;

communicating from the input to the output bus during one or more subsequent cycles further information bits such that the predetermined number of information bits are communicated to the output bus.

Preferably, the output bus contains a predetermined number of the information bits before any of these information bits are communicated from the de-justifier.

Figure 1B:
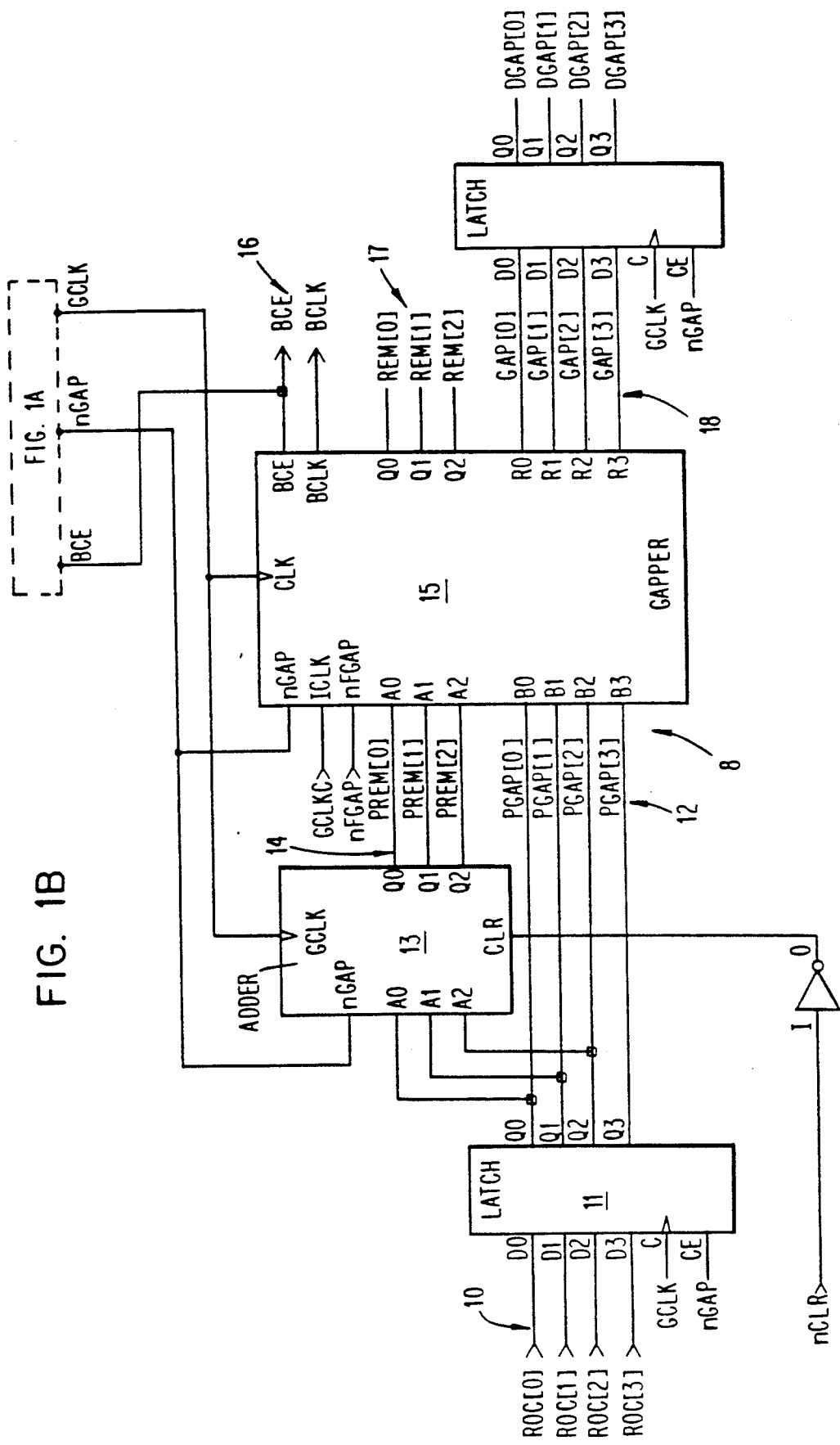
Figure 2A:
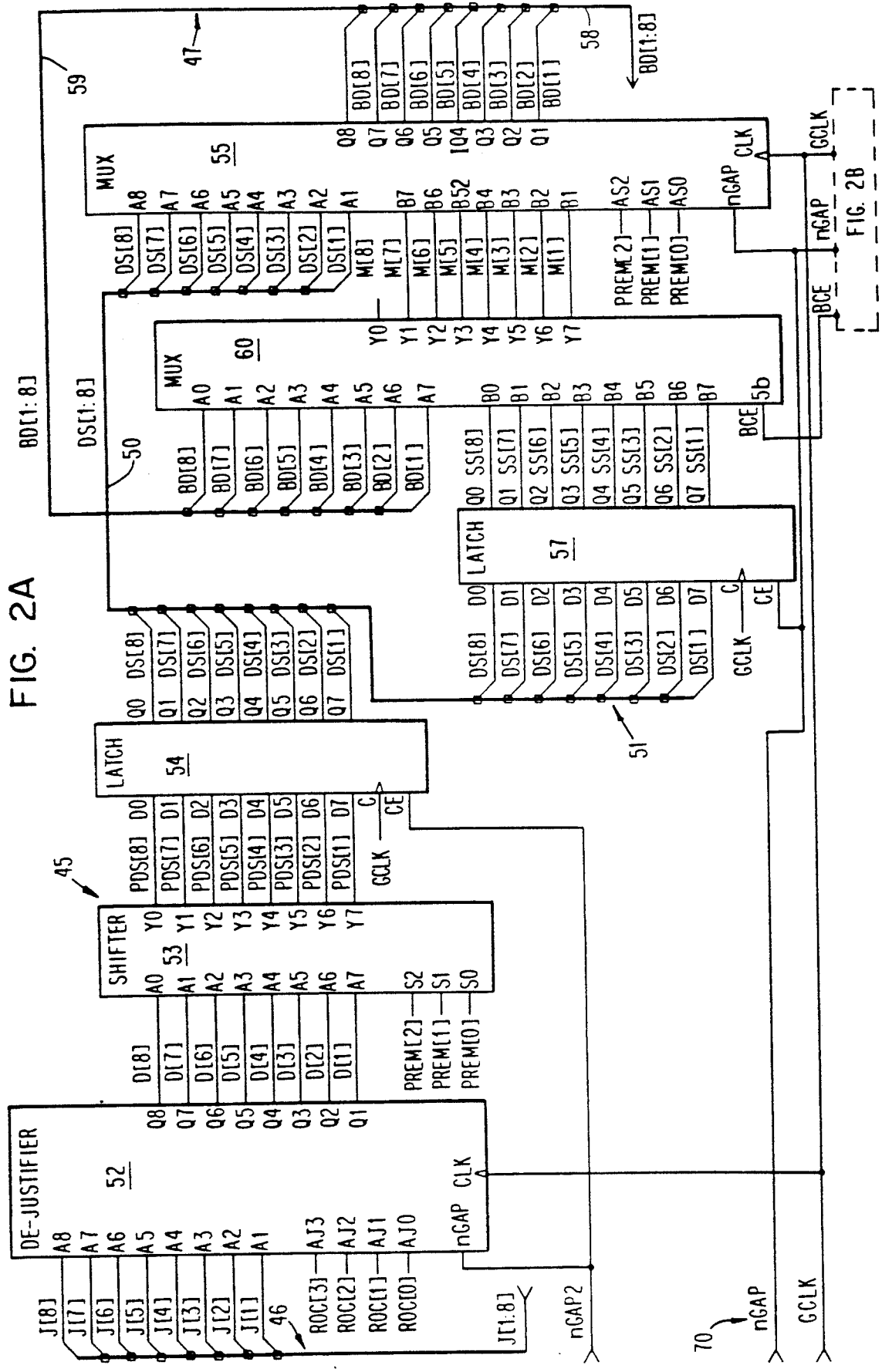
Figure 2B:
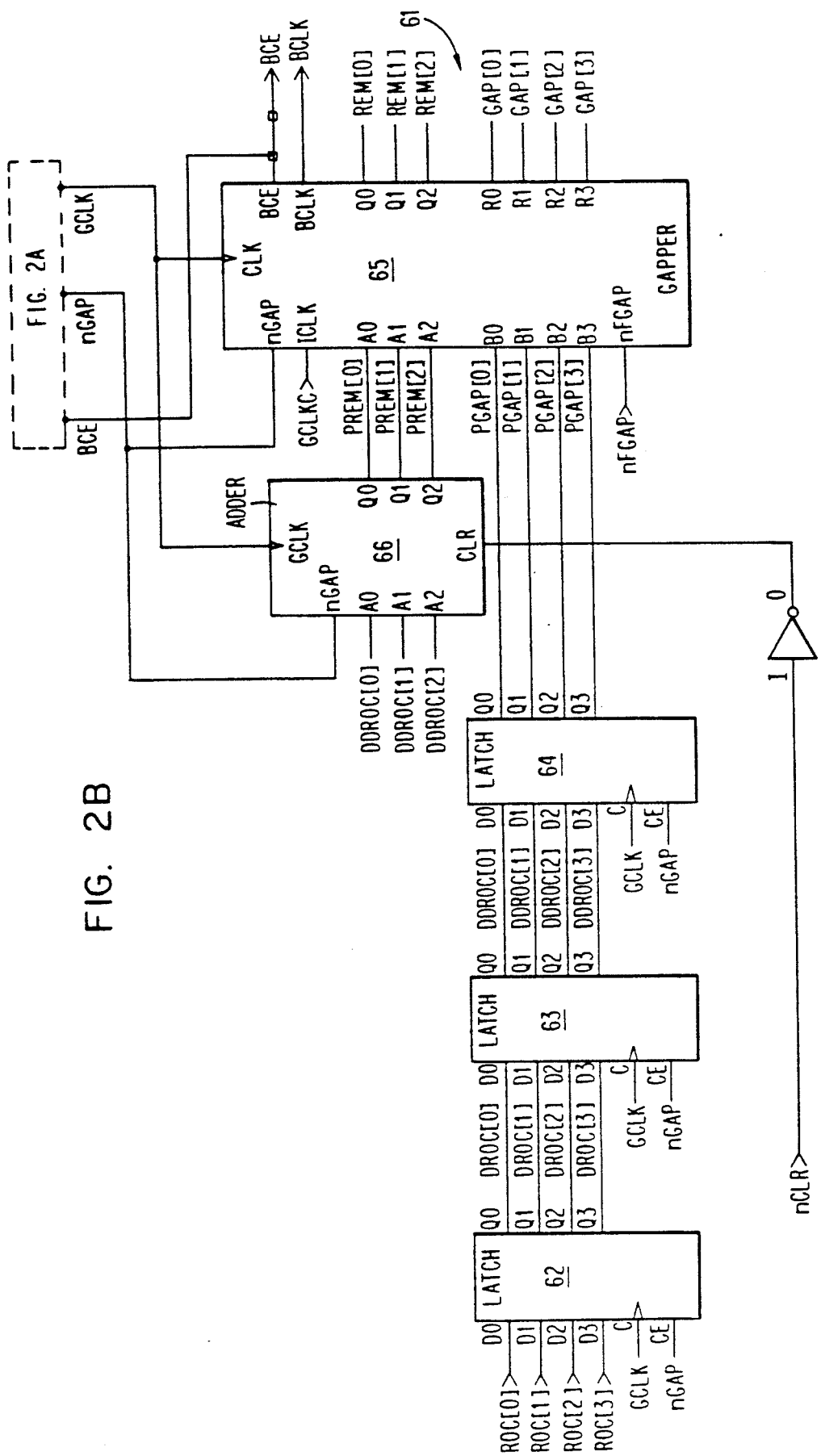

A preferred embodiment of the invention will now be described, by way of example only, with reference to the accompanying drawings in which:

FIGS. 1A and 1B, together, are a schematic circuit diagram of a parallel justifier according to the invention; and FIGS. 2A and 2B, together, are a schematic circuit diagram of a de-justifier according to a second aspect of the invention.

For convenience, an "X" bus having lines "Y" through "Z" will be represented by the notation X[Y:Z].

Referring in particular to FIG. 1, a justifier 1 for performing the parallel justification of data onto a DS-3 includes an input bus 2 referred to as BD[1:8] for selectively communicating eight respective I bits simultaneously to the justifier. An output bus 3, referred to as J[1:8], receives I, R, O and C bits from the justifier in accordance with the mapping at an eighth of the envelope rate to adhere to the envelope rate of 44.736 Mb/s for the asynchronous serial DS-3 transmission. If an alternative envelope rate is required the rate of the data being received on the J[1:8] bus is variable g the system clock or GCLK.

A first data path 5 is connected to input bus 2 via a latch 6 for communicating to output bus 3, during a first cycle of the GCLK, a required number of the I bits. A second data path 7 is also connected to input bus 2 via the same latch 6 for communicating to output bus 3, over one or more subsequent GCLK cycles, the remainder of the I bits such that the mapping is satisfied.

Justifier 1 also includes control means in the form of a control circuit 8 for regulating the flow of the I bits along first and second paths 5 and 7. Circuit 8 is responsive to a first control signal provided by a sequencer (not shown) which is indicative of the mapping to be followed. In this particular embodiment successive first control signals reflect the number of R, O or C bits required in successive bytes of information communicated to output bus 3.

The first control signal is communicated through a control bus 10 which is referred to as ROC[3:0]. Bus 10 terminates at a latch 11 which is responsive to GCLK for communicating the first control signal in the next cycle to a bus 12, that is, PGAP[3:0]. An adder circuit 13 cumulatively sums successive values on PGAP[2:0] and outputs the result on a bus 14, or PREM[2:0].

Both bus 12 and bus 14 communicate with respective inputs of a gapper circuit 15 for producing a BCE clock signal, a remainder signal and a gapping signal which are respectively placed on the BCE, REM[2:0] and GAP[3:0] buses 16, 17 and 18. The signals on REM[2:0] and GAP[3:0] respectively are those signals on lines PREM[2:0] and PGAP[3:0] delayed by one GCLK cycle.

The BCE clock signal is active high to provide a clock enable. When the signal on bus PREM[2:0] is greater than the signal on PGAP[2:0] the BCE clock will not be produced in the next GCLK cycle. That is, BCE will be held low. The BCLK output is an alternative version of the BCE bus which is combined with the GCLK signal to provide clock edges.

Turning now to justifier 1, bus BD[1:8] extends to latch 6, referred to as the D-reg, for subsequently transmitting the I bits onto a D-bus 21 or D[1:8]. D-bus 21 branches into paths 5 and 7 by respective connections to a shifter circuit 22 and a latch 23 which is referred to as the S-reg. Shifter 22 is responsive to the signals on REM[2:0] for providing output signals on the PDS [1:8] bus 24 during the same GCLK Cycle. The PDS[1:8] bus communicates with a latch 25, referred to as the DS-reg, for transmitting the I bits to a bus 26 or DS[1:8]. Bus DS[1:8] are in turn linked to respective inputs of a triangular multiplexer 27.

Referring now to path 7, the output of the S-reg is transmitted to an S-bus 28, or S[1:8], for communicating the I bits to shifter circuit 29 which is responsive to the signals on the REM[2:0] bus. The output, as modified by shifter 29 is communicated during the same GCLK cycle to a PSS[1:8] bus 30 for relaying the signals to a latch 31, referred to as the SS-reg. The output of the SS-reg is transmitted on a SS[1:8] bus to the other inputs of multiplexer 27.

Multiplexer 27 is responsive to the signal on REM[2:0] for selecting an appropriate number of I bits from each of buses DS[1:8] and SS[1:8] for subsequent transmission during the next GCLK cycle to bus 3, or M[1:8]. Bus 3 connects with a justifier circuit 36 which shifts the I bits an appropriate number of bit positions in response to the signal on DGAP[3:0] to ensure that the bits designated for stuffing are reserved. The output of circuit 36 is transmitted onto a bus 40, or J[1:8], which communicates with any further circuitry before the data is transmitted to a remote receiver.

In use, eight I bits are held on bus BD[1:8] during a first GCLK cycle. These bits are transmitted in a second cycle to bus D[1:8] while the control signal on bus ROC[3:0] is transmitted to bus PGAP[3:0]. During this second cycle shifter 22 rotates right the information bits in accordance with the signal conveyed on bus REM[2:0] during the first cycle. That is, a maximum shift of seven positions is possible. The result of this operation is that the bits to be subsequently selected by multiplexer 27 from the first path will be the most significant I bits, which have been moved into the least significant lines of bus PDS[1:8]. The output of this operation is presented in lines PDS[1:8] for subsequent transmission onto lines DS[1:8] by the DS-reg in a third GCLK cycle.

It will be appreciated that the most significant bit lines of the buses carrying I bits are illustrated as the lowermost lines.

During the second cycle, the I bits on bus D[1:8] are also communicated to the inputs of the S-reg for subsequent transmission in the third cycle onto the lines PSS[1:8] following a rotate right operation by shifter 29. Shifter 29 is similar to shifter 22 although responsive to the signals on REM[2:0] in the second cycle. The SS-reg transfers the I bits on bus PSS[1:8] onto bus SS[1:8] in the fourth cycle.

During the third cycle, multiplexer 27 is responsive to the signal on the REM[2:0] bus for selecting the appropriate number of I bits from the least significant bit positions of lines DS[1:8] such that the most significant I bits of the original data loaded in justifier 1 are transferred to a corresponding number of least significant lines on bus M[1:8]. During the fourth cycle those remaining I bits of the original data which were not transferred to lines M[1:8] from lines DS[1:8] in the third cycle are, in response to the revised signal on the REM[2:0] bus, selected by multiplexer 27 from the most significant bit positions on bus SS[1:8] and communicated to the most significant bit lines of bus M[1:8]. This sequential selection of I bits from the DS[1:8] and SS[1:8] buses is determined by the signals on bus REM[2:0] during the second and third cycles.

If, to stay within the mapping, it is necessary to provide more than the number of I bits on lines SS[1:8] which have not been selected from the DS[1:8] bus the cycle before, then a complementary number of most significant bits from the next byte of information are selected by multiplexer 27 from the least significant bits of the DS[1:8] bus. However, if the required number of I bits to be selected from the SS[1:8] bus is less than or equal to that number of bits remaining on the SS[1:8] lines yet to be selected, then as many I bits as are required will be selected from the SS[1:8] bus and transmitted onto bus M[1:8] while also a BCE signal will not be produced and the relevant circuitry will be gapped. That is, the absence of this signal will prevent another byte of I bits on bus BD[1:8] from being loaded into justifier 1 during that GCLK cycle. Instead, the previous information will be held by the D-reg and the S-reg, while shifters 22 and 29 will rearrange these bits in accordance with the subsequent value of the signal on the REM[2:0] lines.

The signals on bus REM[2:0] allow multiplexer 27 to appropriately select the I bits from busses DS[1:8] and SS[1:8]. Consequently, the information bits are progressively transmitted to bus M[1:8] while appropriate lines of this bus are left vacant for stuffing, which is generally inserted during subsequent processing. The signals on bus M[1:8] are communicated to subsequent circuitry every GCLK cycle such that a predetermined rate of justified data is transmitted for parallel to serial conversion. This data includes an appropriate combination of I, R, O and C bits in accordance with the mapping. That is, the output rate of justifier 1 is constant, with the signals on bus M[1:8] being updated each GCLK cycle. However, it is necessary to gap the supply of I bits due to the addition of the stuffing.

In this particular embodiment justifier 1 includes a justification circuit 36 which is responsive to the signal on bus DGAP[3:0] for right shifting the data on bus M[1:8] such that the bits intended for stuffing are for the time being given a zero value. The stuffed values are, if required, inserted by further componentry.

In alternative embodiments justification circuit 36 is responsive to a second control signal which is provided either by the sequencer or other suitable circuitry. In this form the I bits on the M[1:8] bus are able to be mapped as required. The use of both first and second control signals allows a greater number of possible I bit configurations to be achieved by justifier 1.

Referring now to FIG. 2, de-justifier 45 allows the de-justification of data from a predetermined mapping, and in particular for de-justifying the I bits which have been arranged by justifier 1. Consequently, in this embodiment de-justifier 45 operates at the same clock speed as justifier 1 and for convenience this will also be referred to as the GCLK. De-justifier 45 includes an input bus 46, defined in part by the J[1:8] bus for communicating to the de-justifier in accordance with the mapping a plurality of I bits and a complementary number of R, O and C bits such that in each GCLK cycle eight bits are received on bus J[1:8]. An output bus 47, referred to as BD[1:8] receives a predetermined number of I bits from the de-justifier.

A first data path 50 extends from input bus 46 for communicating to bus BD[1:8] in one cycle at least some of the I bits received. A second data path 51 is connected to input bus 46 to communicate to bus BD[1:8] during one or more subsequent GCLK cycles any I bits not communicated by the first path.

Input bus 46 includes: a de-justifier circuit 52 for left shifting the incoming bits on J[1:8] such that the I bits are in the most significant bit positions; a shifter 53, or the D-reg shifter, for left rotating the I bits placed on bus D[1:8] by circuit 52; a latch 54, or the DS-reg, for delaying the I bits for subsequent transmission onto paths 50 and 51.

Path 50 includes one branch of bus DS[1:8] which extends between latch 54 and a triangular multiplexer 55, while path 51 includes in part the second branch of bus DS[1:8] which terminates at latch 57 which is referred to as the SS-reg.

The output bus BD[1:8] includes a first branch 58 which is connected with a memory array or the like. A second branch 59, however, is connected with the input of a second multiplexer 60 having at its other input bus SS[1:8]. Multiplexer 60 selects the I bits on either the BD[1:7] or SS[1:7] buses for transmission to the M[1:8] bus.

De-justifier 45 also includes a control circuit 61 which is very similar in operation to control circuit 8 for justifier 1. The first control signals indicative of the mapping are sequentially transmitted on the ROC[3:0], DROC[3:0], DDROC[3:0], PGAP[3:0] and GAP[3:0] buses during successive GCLK cycles. The delays are provided by latches 62, 63, 64 and gapper circuit 65.

An adder circuit 66 similarly sums successive values on the DDROC[2:0] bus to provide a remainder signal on the PREM[2:0] bus, which is in turn supplied to gapper circuit 65 for comparison with the signal on the PGAP[3:0] bus.

In response to the signals received, circuit 65 provides a BCE clock signal, a remainder signal and a delayed mapping signal which are respectively transmitted on the BCE, REM[2:0] and GAP[3:0] buses.

In operation, the I bits and the R, O and C bits contained within an incoming byte will be transmitted along bus J[1:8]. After removal of the R, O and C bits, and then left rotation of the I bits into the most significant bit position by circuit 52 and shifter 53 respectively, the I bits are placed on the DS[1:8] bus. Multiplexer 55 then selects from the DS[1:8] bus the required number of bits to communicate to output bus 47.

If the number of I bits on the B[1:8] bus is less than eight a BCE signal is not generated and consequently those bits on the BD[1:7] bus are selected for communication to the M[1:7] bus during the next GCLK cycle. Accordingly, the I bits are re-arranged into the original byte configurations assumed prior to justification, and transmitted to the BD[1:8] bus for subsequent use. Although fresh data will be loaded onto the J[1:8] bus each GCLK cycle, due to the removal of the R, O and C bits the output is gapped until the appropriate eight I bits are loaded onto the BD[1:8] bus.

If the justification of the I bits has included the use of the second control signal., it is necessary to similarly provide de-justifier circuit 52 with this second signal. In this configuration it will be appreciated that control circuit 61 continues to be provided with the first control signal.

Referring to both FIG. 1 and FIG. 2 an nGAP control line 70 is illustrated. This control line communicates with a number of components and is the GCLK clock enable. The nGAP line is active high, and when held low prevents the GCLK from progressing and as such disables the justifier or de-justifier, as the case may be. The nGAP line is not required in all applications, however, it is included where further gapping is necessary when mapping into the synchronous envelope.

The parallel nature of the operations performed allow the use of higher scale integration due to the lower clock speeds being used. In this embodiment the GCLK runs at an eighth of the envelope frequency, however, by increasing the number of parallel lines on the busses the GCLK rate is able to be further reduced.

The operation of the justifier an de-justifier is generally complementary to facilitate their combined use within a communication system. In such a system, justifier 1 generally performs the mapping of an asynchronous tributary into an envelope for subsequent synchronous transmission. De-justifier 45 extracts the tributary from the envelope following transmission. It will be appreciated that a number of justifiers are able to work in parallel to provide the desired number of tributaries to be included within the envelope. A corresponding number of de-justifiers for extracting those tributaries are then included at the receiving end of the transmission line used.

The invention has been described with reference to a parallel justifier and de-justifier which operate on individual I-bits, however, it is equally applicable for the justification and de-justification of groups of I bits, for example bytes or nibbles. For example, if 32 I bits are placed on an input bus, and the envelope requires either 0, 8, 16, 24 or 32 I bits to be placed on the output bus during any GCLK cycle, then a four byte justifier is used.

The resultant configuration provides a simple and cheap alternative to known asynchronous justification and de-justification systems.

Although the invention has been described with reference to a specific example, it will be appreciated by those skilled in the art that the invention may be embodied in many other forms.

I claim:

1. A justifier for performing parallel justification of data in accordance with a predetermined mapping, said justifier including:

an input bus for selectively communicating a plurality of information bits to said justifier;

control means responsive to a control signal indicative of said mapping for providing a remainder signal;

a first data path connecting said input bus to first inputs of a multiplexer and including a first shifter responsive to said remainder signal during a first cycle for shifting a predetermined number of said information bits from said input bus into the least significant bit position or positions of said first data path;

a second data path connecting said input bus to second inputs of said multiplexer and including a second shifter responsive to said remainder signal during a second cycle following said first cycle for shifting the remainder of the information bits from said input bus into the least significant bit position or positions of said second data path;

said multiplexer being responsive to said remainder signal during a third cycle following said second cycle for communicating said information bits from said first and second paths to an output bus such that said mapping is followed and the sequence of said information bits is maintained.

2. A justifier according to claim 1 wherein said output bus includes a final justifier circuit for ensuring that information bits on said output bus are in either the most or least significant bit positions.

3. A justifier according to claim 2 wherein said final justifier circuit is responsive to one of the following:
   (a) said control signal;
   (b) said remainder signal; and
   (c) a second control signal derived from (a) or (b), or a combination thereof.

4. A justifier according to claim 1 wherein said control means sums successive control signals for providing said remainder signal.

5. A justifier according to claim 4 wherein said control signals are sequentially provided by a sequencer and are indicative of the number of information bits required to be communicated to the output bus during respective cycles.

6. A justifier according to claim 1 wherein said control means produces a clock disable signal which is operative when said remainder signal in one cycle is greater than said control signal in a previous cycle, said clock disable signal preventing additional information bits being communicated from said input bus to said justifier in the following cycle.

7. A de-justifier for performing the parallel de-justification of data from a predetermined mapping, said de-justifier including:

an input bus for selectively communicating a plurality of information bits to said de-justifier;

control means responsive to a control signal indicative of said mapping for providing a remainder signal;

a shifter communicating with said input bus and being responsive to said remainder signal during a first cycle for arranging said information bits in a desired significant bit position on said input bus;

a first data path connecting said input bus to first inputs of a first multiplexer;

a second data path connecting said input bus to second inputs of said first multiplexer;

said first multiplexer being responsive to said remainder signal during a second cycle following said first cycle for communicating a predetermined number of said information bits from said first and second data paths to an output bus such that said information bits are extracted from said mapping and retained in sequence.

8. A de-justifier according to claim 7 wherein said input bus includes an initial de-justifier circuit for ensuring the information bits on said input bus are shifted from the least or most significant bit positions, as the case may be, to a desired significant bit position.

9. A de-justifier according to claim 8 wherein said initial de-justifier circuit is responsive to one of the following:
   a) said control signal;
   b) said remainder signal; and
   c) a second control signal derived from a) or b), or a combination thereof.

10. A de-justifier according to claim 7 wherein said control means sums successive control signals for providing said remainder signal.

11. A de-justifier according to claim 7 wherein said control signals are sequentially provided by a sequencer and are indicative of the number of information bits being communicated on the input bus during respective cycles.

12. A de-justifier according to claim 7 wherein said control means produces a clock disable signal which is operative when said remainder signal in one cycle is greater than said control signal in a previous cycle, said clock disable signal allowing said multiplexer during the following cycle to re-select said information bits from said first and second paths.

13. A de-justifier according to claim 12 wherein said second data path includes means for communicating to said second inputs of said first multiplexer during a cycle following that cycle when said clock disable signal is produced, those information bits on said output bus during the previous cycle.

14. A method of performing parallel justification of data in accordance with a predetermined mapping, said method including:
   selectively communicating on an input bus a plurality of information bits to a justifier;
   providing a control signal indicative of said mapping to control means, the control means subsequently providing a remainder signal;
   communicating the information bits on said input bus to first inputs of a multiplexer via a first data path having a first shifter responsive to said remainder signal during a first cycle so a predetermined number of said information bits are shifted from said input bus into the least significant bit position or positions of said first data path;
   communicating the information bits on said input bus to second inputs of said multiplexer via a second data path having a second shifter responsive to said remainder signal during a second cycle following said first cycle so the remainder of the information bits are shifted from said input bus into the least significant bit position or positions of said second data path; and
   supplying said multiplexer with said remainder signal during a third cycle following said second cycle so said information bits are communicated from said first and second data paths to an output bus such that said mapping is followed and the sequence of said information bit is maintained.

15. A method according to claim 14 including the further step of communicating said information bits to a final justifier circuit so the information bits on said output bus are in either the most or least significant bit positions.

16. A method according to claim 15 wherein said final justifier circuit is responsive to one of the following:
   (a) said control signal;
   (b) said remainder signal; and
   (c) a second control signal derived from (a) or (b), or a combination thereof.

17. A method according to claim 14 wherein said remainder signal is derived from a sum of successive control signals.

18. A method according to claim 17 wherein said control signals are sequentially provided by a sequencer and are indicative of the number of information bits required to be communicated to the output bus during respective cycles.

19. A method according to claim 14 wherein said control means produces a clock disable signal which is operative when said remainder signal in one cycle is greater than said control signal in a previous cycle, said clock disable signal preventing additional information bits from being communicated from said input bus to said justifier in the following cycle.

20. A method of performing parallel de-justification of data from a predetermined mapping, said method including:
   selectively communicating on an input bus a plurality of information bits to a de-justifier;
   providing a control signal indicative of said mapping to control means, the control means subsequently providing a remainder signal;
   responding to said remainder signal during a first cycle so said information bits are arranged in a desired significant bit position on said input bus;
   communicating said information bits on said input bus to first inputs of a first multiplexer via a first data path;
   communicating said information bits on said input bus to second inputs of said first multiplexer via a second data path;
   providing said first multiplexer with said remainder signal during a second cycle following said first cycle so the predetermined number of said information bits are communicated from said first and second data paths to an output bus such that said information bits are extracted from said mapping and retained in sequence.

21. A method according to claim 20 further including shifting the information bits on said input bus from the least or most significant bit positions, as the case may be, to a desired significant bit position.

22. A method according to claim 21 wherein said shifting is in response to one of the following:
   (a) said control signal;
   (b) said remainder signal; and
   (c) a second control signal derived from (a) or (b), or a combination thereof.

23. A method according to claim 20 wherein said control means sums successive control signals for providing said remainder signal.

24. A method according to claim 20 wherein said control signals are sequentially derived by a sequencer and are indicative of the number of information bits being communicated on the input bus during respective cycles.

25. A method according to claim 20 wherein said control means produces a clock disable signal which is operative when said remainder signal in one cycle is greater than said control signal in a previous cycle, said clock disable signal allowing said multiplexer during the following cycle to re-select said information bits from said first and second paths.

26. A method according to claim 25 wherein said second data path communicates to said second inputs of said first multiplexer during a cycle following that cycle when said clock disable signal is produced, those information bits on said output bus during the previous cycle.

* * * * *